(12) United States Patent
Kim

(10) Patent No.: US 8,782,259 B2
(45) Date of Patent: Jul. 15, 2014

(54) APPARATUS AND METHOD FOR AUTOMATIC CHANNEL SETUP

(75) Inventor: Yo-Han Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 13/145,449

(22) PCT Filed: Jan. 22, 2010

(86) PCT No.: PCT/KR2010/000427
§ 371 (c)(1),
(2), (4) Date: Jul. 20, 2011

(87) PCT Pub. No.: WO2010/085116
PCT Pub. Date: Jul. 29, 2010

(65) Prior Publication Data
US 2011/0283004 A1    Nov. 17, 2011

(30) Foreign Application Priority Data
Jan. 23, 2009  (KR) ........................ 10-2009-0005952

(51) Int. Cl.
*G06F 15/16*  (2006.01)

(52) U.S. Cl.
USPC .......................................... 709/228; 709/209

(58) Field of Classification Search
USPC .................................. 709/208–211, 220–223
See application file for complete search history.

(56) References Cited

U.S. PATENT DOCUMENTS

| | | | |
|---|---|---|---|
| 4,750,115 A * | 6/1988 | Sekiya et al. | 709/208 |
| 5,494,416 A | 2/1996 | Gergets | |
| 5,495,516 A * | 2/1996 | Lee et al. | 379/14.01 |
| 6,510,449 B1 | 1/2003 | Yanbe | |
| 2003/0003967 A1 * | 1/2003 | Ito | 455/567 |
| 2003/0009573 A1 * | 1/2003 | Sumida | 709/230 |
| 2004/0081118 A1 * | 4/2004 | Mukherjee et al. | 370/328 |
| 2005/0021770 A1 * | 1/2005 | Helm et al. | 709/228 |
| 2005/0198277 A1 * | 9/2005 | Wada et al. | 709/224 |
| 2005/0204043 A1 * | 9/2005 | Harper et al. | 709/227 |
| 2006/0165093 A1 * | 7/2006 | Borella et al. | 370/395.52 |
| 2006/0209720 A1 * | 9/2006 | Nelson | 370/254 |
| 2007/0253437 A1 * | 11/2007 | Radhakrishnan et al. | 370/401 |
| 2009/0296602 A1 * | 12/2009 | Bange et al. | 370/254 |
| 2010/0272030 A1 * | 10/2010 | Babbar | 370/329 |

FOREIGN PATENT DOCUMENTS

| | | |
|---|---|---|
| JP | 62-80755 A | 4/1987 |
| JP | 2000-092571 A | 3/2000 |
| JP | 2006-270957 A | 10/2006 |
| KR | 10-2002-0076773 A | 10/2002 |

\* cited by examiner

*Primary Examiner* — Dustin Nguyen
*Assistant Examiner* — Michael A Keller
(74) *Attorney, Agent, or Firm* — Jefferson IP Law, LLP

(57) ABSTRACT

Provided is a device and a method for automatically setting up a channel. A method for setting up a channel in a slave node includes examining whether a Link Control Protocol (LCP) session with a master node is opened by changing a time slot within a variable range, and performing an Internet Protocol Control Protocol (IPCP) connection with the master node when the LCP session is opened.

10 Claims, 8 Drawing Sheets

APPARATUS AND METHOD FOR AUTOMATIC CHANNEL SETUP

PRIORITY

This application claims priority to an application filed as PCT/KR2010/000427 on Jan. 22, 2010 claiming priority of the Korean Application filed in Korean Intellectual Property Office on Jan. 23, 2009 and assigned Ser. No. 10-2009-0005952, the contents of which are incorporated herein by reference.

BACKGROUND OF THE INVENTION

1. Field of the Invention

The present invention relates to a device and a method for completing setup of a channel by setting up channel information for supporting fractional T1 only with a master node between both nodes, and automatically searching for a corresponding setup with a slave node.

2. Description of the Related Art

For efficient use of E1/T1 link which is one of lines of facilities-based telecommunication, a fractional E1/T1 function is generally used.

The fractional E1/T1 function represents a technique of using a needed amount of time slots, which are media of physical circuit stream, without using the whole of 24 time slots for T1 and 32 time slots for E1.

In the case that an amount of communication data is small, a single T1 line may be shared by several communication providers (or users). Therefore, efficiency of link may be improved and cost for a communication provider may be reduced.

However, for supporting fractional T1, both communication nodes should share setup information (the number and assigned numbers of time slots) about a fractional channel used.

FIG. 1 illustrates a typical process of setting up a channel.

Referring to FIG. 1, under the assumption that a core network equipment (hereinafter, referred to as a master node) 110 and an access equipment (hereinafter, referred to as a slave node) 150 are connected to each other through a T1 network 130 in a mobile communication system, both nodes should be set up as predetermined during an initial operation to thereby enable communication.

The T1 network 130 includes a time slot switch, a multiplexer, and a repeater. The transmitting node (master node) 110 transmits data to the T1 network 130 through a predefined T1 time slot (channel). The data included in the time slot are transmitted to a next equipment from the repeater of the T1 network 130, and the time slot switch of the T1 network 130 changes a particular time slot to a predetermined another time slot.

The multiplexer of the T1 network 130 combines data included in time slots of multiple T1s with one T1 to transmit the data (this method is used for efficient use of T1 for an inter-node communication which needs a small amount of time slots by supporting an inter-node communication of multiple pairs of nodes by using a single long distance line).

The receiving node (slave node) 150 receives data from the T1 network 130 through a preset time slot.

For an inter-node communication, each node should know beforehand through what time slot they should transmit and receive data to/from the T1 network 130, and should set up channel information to thereby transmit and receive data by using a determined slot.

FIG. 2 illustrates a typical process of changing a channel setup.

Referring to FIG. 2, under the assumption that a master node 210 and a slave node 250 are connected to each other through a T1 network 230 in a mobile communication system, both nodes should be set up as predetermined during an initial operation to thereby enable communication.

The master node 210 is located in a station where an operator resides. However, the slave node 150 is typically located in a place which is difficult for an operator to access, and it occurs frequently that a plurality of slave nodes are installed at the same time.

In the case of using fractional T1, when channel information needs to be changed when the slave node 250 is initially installed or while the slave node 250 is operated, an operator should manually find out channel information of the slave node 250 to set up the channel information.

That is, this operation requires a manual setup, and thus the channel setup is not accomplished without a manual setup. Therefore, a device and a method for automatically setting up a channel when a channel is initially installed or when a channel is changed during operation are needed.

SUMMARY OF THE INVENTION

An object of the present invention is to substantially solve at least the above problems and/or disadvantages and to provide at least the advantages below. Accordingly, an object of the present invention is to provide a device and a method for automatically setting up a channel.

Another object of the present invention is to provide a device and a method for easily operating a communication network and reducing operation cost by enabling automatic channel setup for a slave node when the slave node is installed or when channel information of a master node is changed to thereby enable communication between the master node and the slave node even though an installer or an operator does not have detailed knowledge of setting up a channel for the slave node.

According to an aspect of the present invention, a method for setting up a channel in a slave node using a fractional E1/T1 function includes examining (inspecting) whether a Link Control Protocol (LCP) session with a master node is opened by changing a time slot within a variable (changeable) range, and performing (executing) an Internet Protocol Control Protocol (IPCP) connection with the master node when the LCP session is opened.

According to another aspect of the present invention, a method for setting up a channel in a master node using a fractional E1/T1 function includes examining whether an LCP session with a slave node is opened by using a configured time slot, and performing an IPCP connection with the slave node when the LCP session is opened.

According to another aspect of the present invention, a device for a slave node which sets up a channel by using a fractional E1/T1 function includes a Link Control Protocol (LCP) unit examining whether an LCP session with a master node is opened by changing a time slot within a variable range, and an Internet Protocol Control Protocol (IPCP) unit performing an IPCP connection with the master node when the LCP session is opened.

According to another aspect of the present invention, a device for a master node which sets up a channel by using a fractional E1/T1 function includes an LCP unit examining whether an LCP session with a slave node is opened by using a configured time slot, and an IPCP unit performing an IPCP connection with the slave node when the LCP session is opened.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, detailed descriptions of well-known functions or constructions will be omitted since they would obscure the invention in unnecessary detail.

Hereinafter, a device and a method for automatically setting up a channel according to the present invention will be described.

Figure 1:
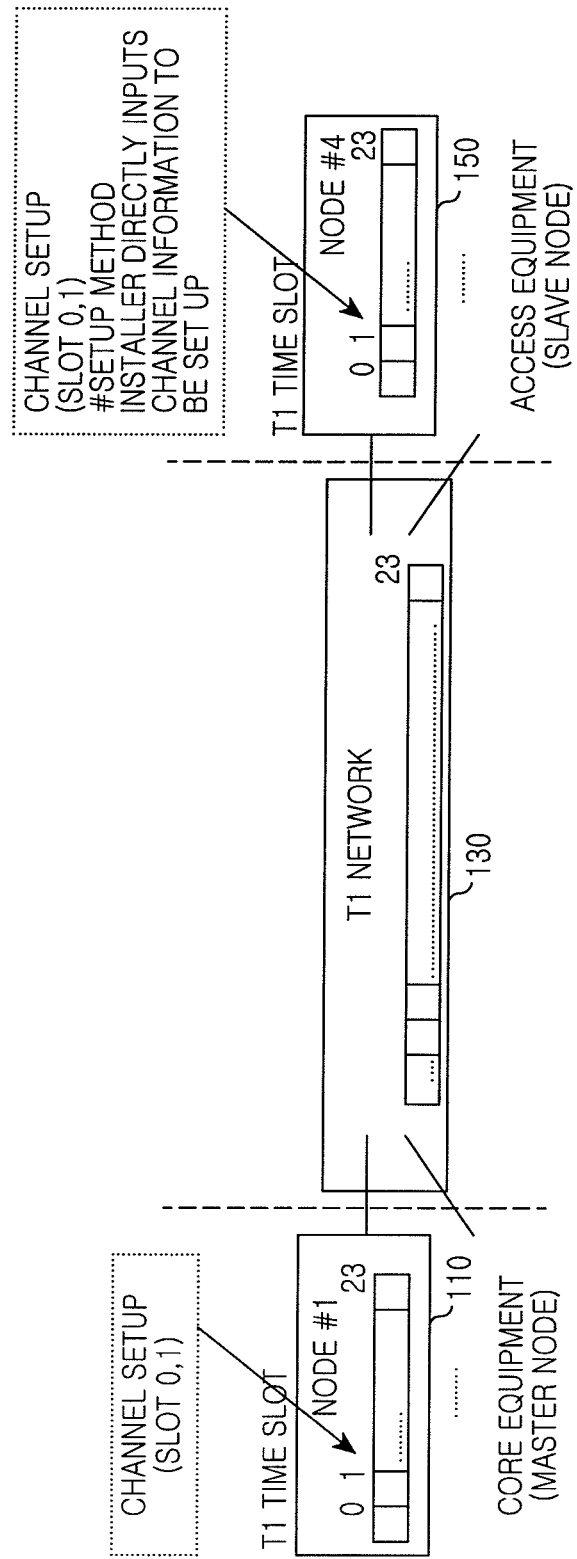
FIG. 1 illustrates a typical process of setting up a channel.
Figure 2:
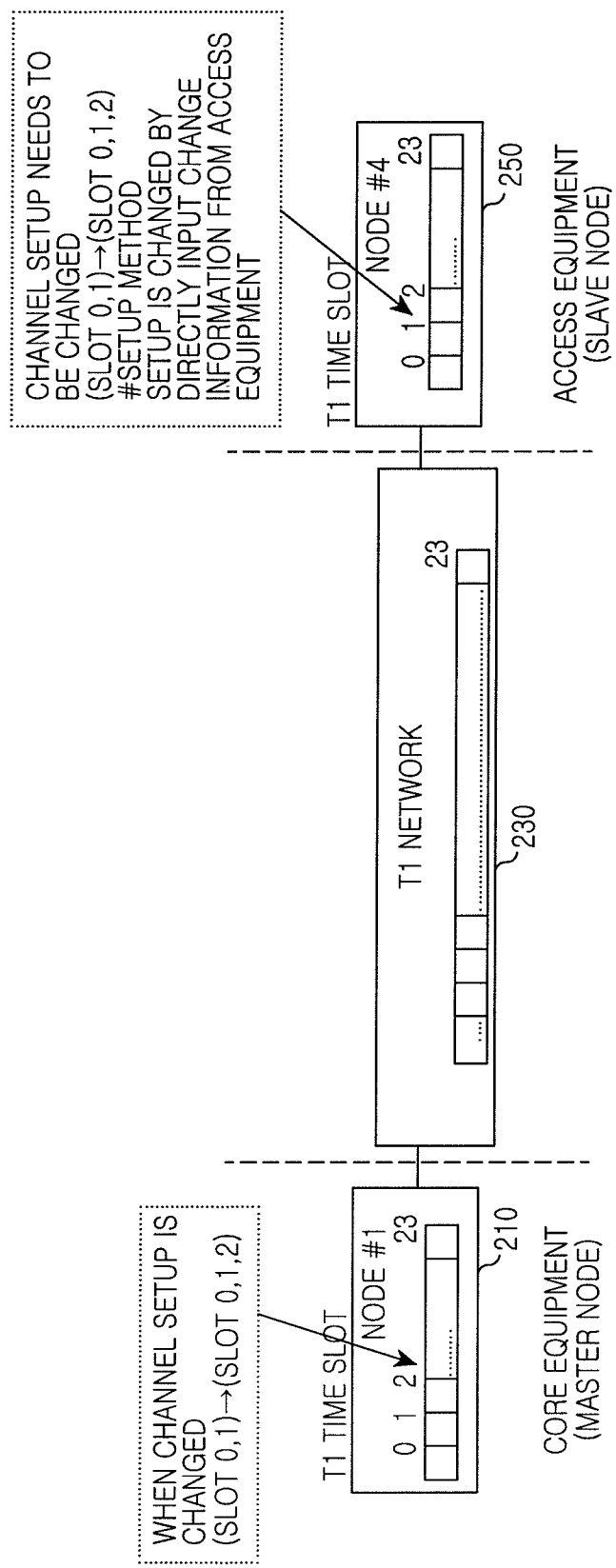
FIG. 2 illustrates a typical process of changing (altering) a channel setup.
Figure 3:
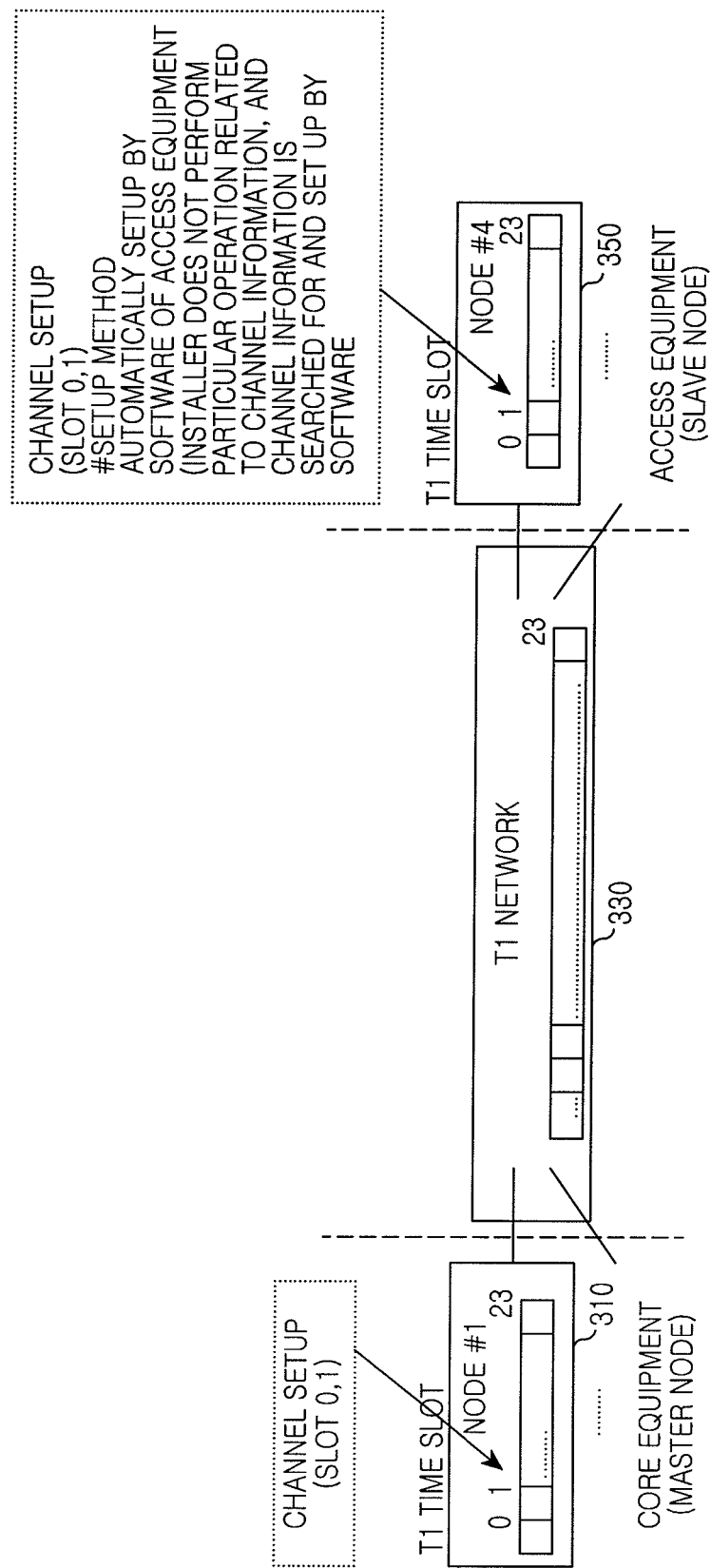
FIG. 3 illustrates a process of setting up a channel according to an embodiment of the present invention.

FIG. 3 illustrates a process of setting up a channel according to an embodiment of the present invention.

Referring to FIG. 3, a master node 310 waits for setting up a channel to a slave node 350 through a T1 network 330.

The slave node 350 runs a program for setting up a channel. The program tries to connect a Link Control Protocol (LCP) to the master node 310 by changing a slot during a connection process using a Point to Point Protocol (PPP).

The LCP provides a function for monitoring a link setup and performing a certification operation by exchanging LCP packets between nodes. The LCP packet communication is possible after channel information between nodes is set up. The fact that the LCP packet communication is possible, i.e., that the LCP connection is established, indicates that the channel information is correctly set up.

When the LCP connection is completed, the slave node 350 starts a process of Network Control Protocol (NCP) connection, and starts a connection using Internet Protocol Control Protocol (IPCP) which is one of NCP to perform an IP allocation process.

The IPCP is operated after a session is opened through the LCP, and provides a function of IP address allocation. The slave node 350 is allocated an IP address through the IPCP.

Figure 4:
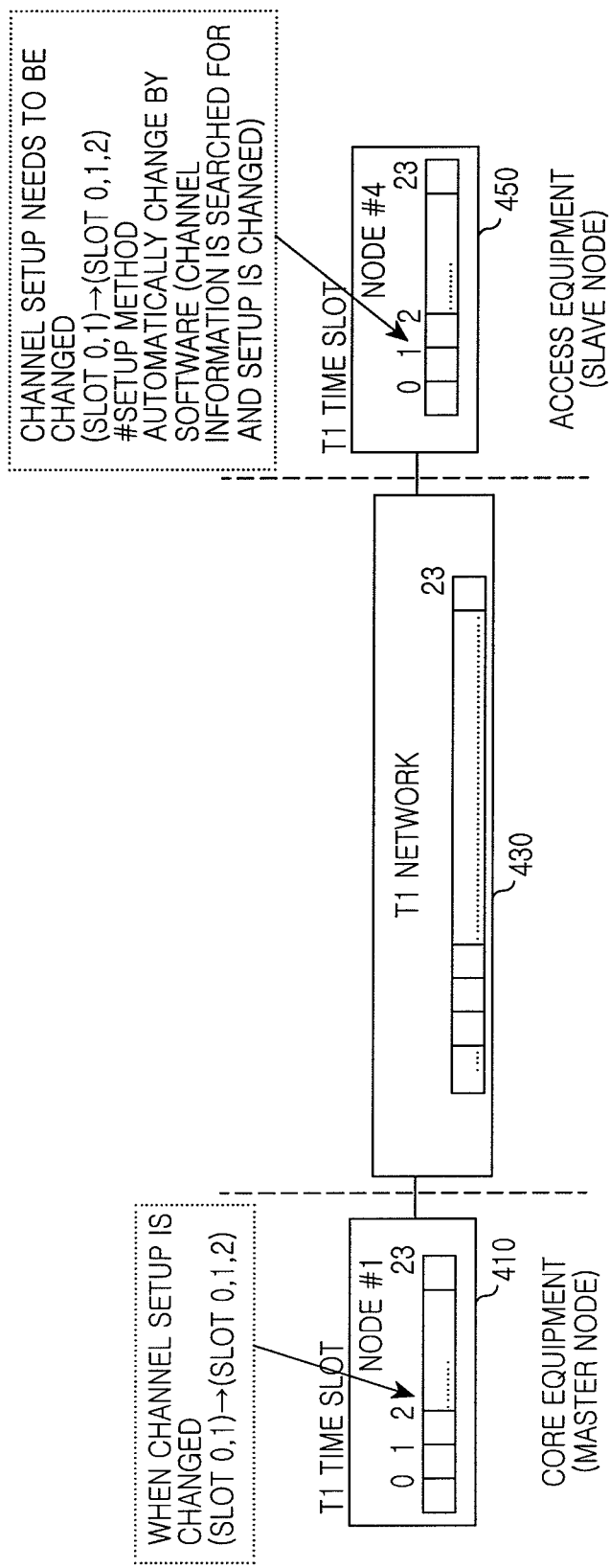
FIG. 4 illustrates a process of changing a channel setup according to an embodiment of the present invention.

FIG. 4 illustrates a process of changing (altering) a channel setup according to an embodiment of the present invention.

Referring to FIG. 4, a master node 410 waits for setting up a channel to a slave node 450 when a channel is changed during communication with the slave node 450 through a T1 network 430.

The slave node 450 runs a program for setting up a channel. The program tries to connect an LCP to the master node 410 by changing a slot during a connection process using a PPP.

When the LCP connection is completed, the slave node 450 starts a process of NCP connection, and starts a connection using IPCP which is one of NCP to perform an IP allocation process.

Figure 5:
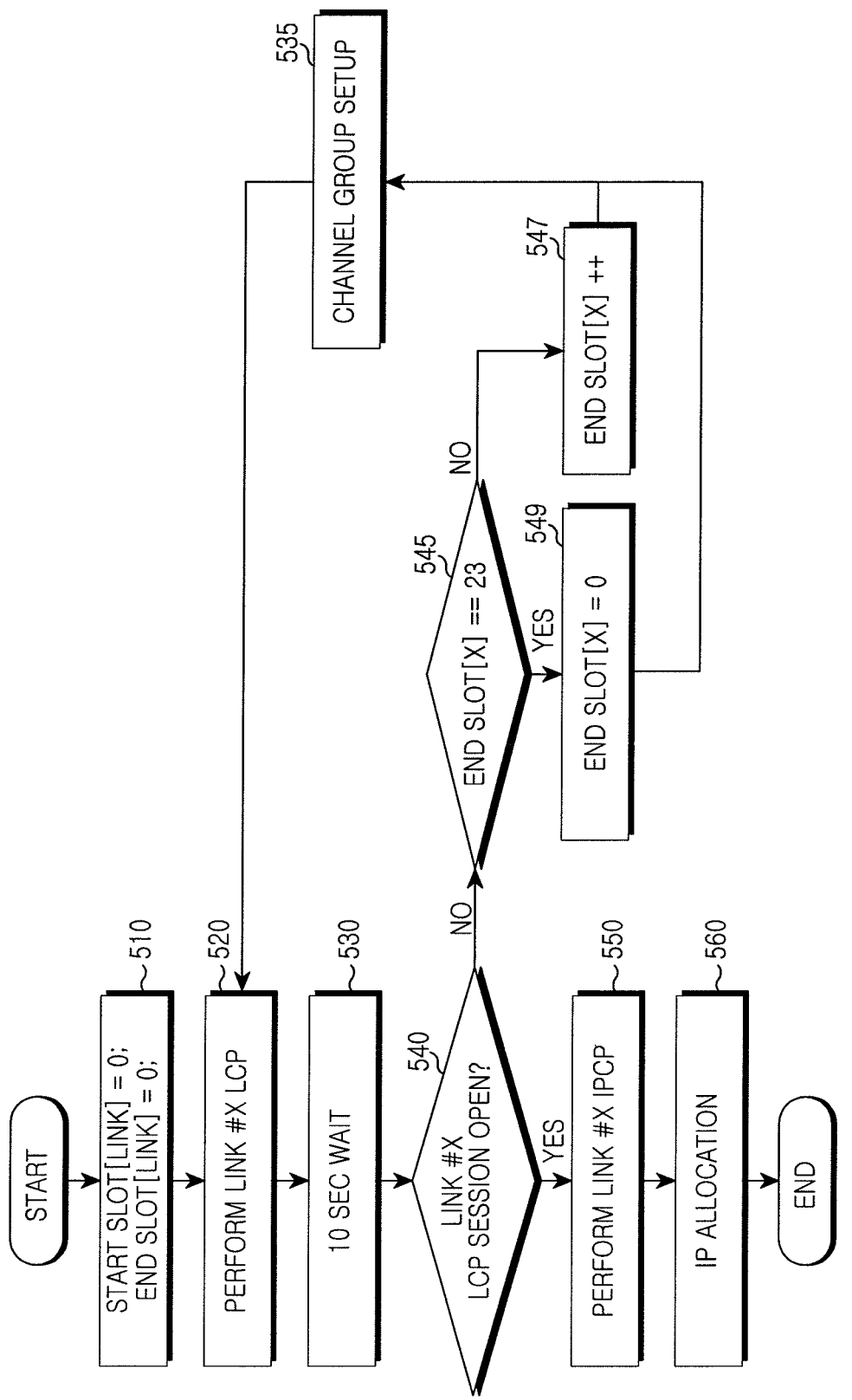
FIG. 5 is a flowchart illustrating an operation process of a slave node according to an embodiment of the present invention.

FIG. 5 is a flowchart illustrating an operation process of the slave node according to an embodiment of the present invention.

Referring to FIG. 5, the slave node starts an LCP connection during a PPP connection process to set up a channel. The master node stands by for the LCP connection during the PPP connection process to set up a channel.

The slave node configures a start slot and an end slot as 0 when the LCP connection is started in step 510. Then, the slave node tries to establish the LCP connection by using the configured values of the start and end slots in step 520, and stands by for a certain time (about 10 seconds) in step 530.

Thereafter, in the case that the LCP connection using the configured values of the start and end slots is successful, i.e., in the case that an LCP session is opened, in step 540, an IPCP connection is started in step 550, and an IP allocation process is performed in step 560.

If the LCP connection using the configured values of the start and end slots fails, i.e., if the LCP session fails to be opened, in step 540, the configured value of the end slot is examined (inspected) to determine whether the configured value of the end slot is an end slot value (e.g., 23) among slot values.

If the configured value of the end slot is the end slot value (e.g., 23) among slot values in step 545, the configured value of the end slot is reconfigured as 0 in step 549 to set up a channel (set up a channel group) in step 535, and the slave node tries to establish the LCP connection by using the configured slot value in step 520. Then, the above described processes are repeated.

If the configured value of the end slot is not the end slot value (e.g., 23) among slot values in step 545, the configured value of the end slot is increased by one in step 547 to set up a channel (set up a channel group) in step 535, and the slave node tries to establish the LCP connection by using the configured slot value in step 520. Then, the above described processes are repeated.

Herein, the slot represents a time slot. In addition, it is assumed that an initially configured value is used as the start slot value, and the start slot value may be configured as another value but is not changed during an operation based on an algorithm.

Also, the end slot value is repeated from start to end to cope with an exceptional situation, i.e., to cope with a case in which the master node cannot respond because the master node encounters an exceptional situation.

Figure 6:
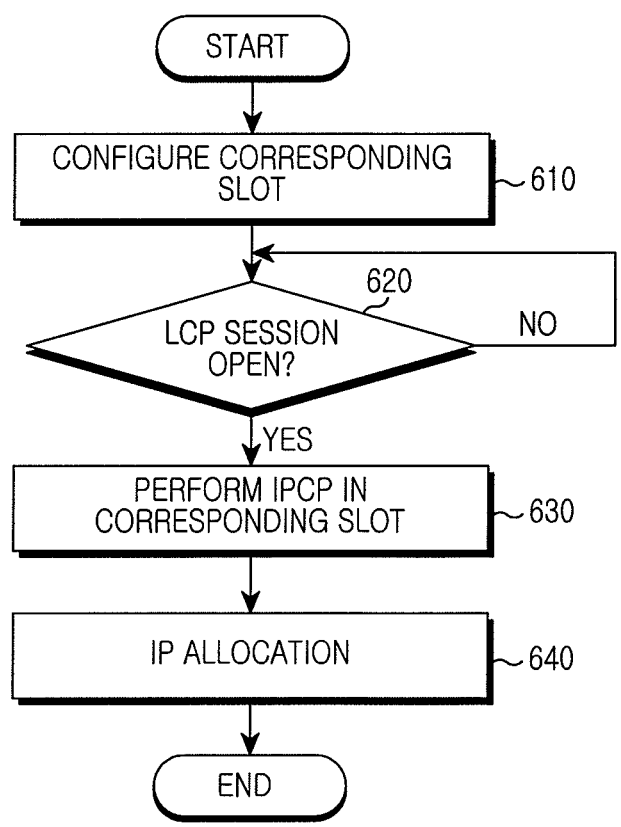
FIG. 6 is a flowchart illustrating an operation process of a master node according to an embodiment of the present invention.

FIG. 6 is a flowchart illustrating an operation process of the master node according to an embodiment of the present invention.

Referring to FIG. 6, the master node configures a corresponding slot for a connection in step 610 in the same manner as in FIG. 5. That is, the master node configures a start slot and an end slot as a predetermined value.

Thereafter, in the case that an LCP session with the slave node is opened for the corresponding slot in step 620, an IPCP connection process is performed in the corresponding slot in step 630 to thereby allocate an IP to the slave node in step 640.

Figure 7:
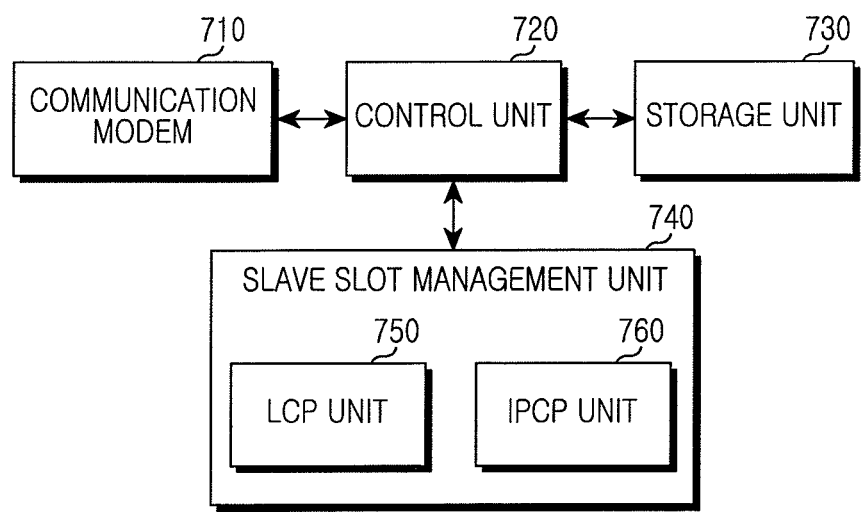
FIG. 7 is a block diagram illustrating a slave node according to an embodiment of the present invention.

FIG. 7 is a block diagram illustrating the slave node according to an embodiment of the present invention.

Referring to FIG. 7, the slave node includes a communication modem 710, a control unit 720, a storage unit 730, and a slave slot management unit 740. The slave slot management unit 740 includes an LCP unit 750 and an IPCP unit 760.

The communication unit 710 includes a wire processing unit and a baseband processing unit for communicating with another node. The wire processing unit converts a signal received through a wire path to a baseband signal to provide the baseband signal to the baseband processing unit, and converts a baseband signal from the baseband processing unit to a wire signal to transmit the wire signal through an actual wire path.

The control unit 720 controls an overall process of the slave node. Particularly, the control unit 720 controls the slave slot management unit 740 according to the present invention.

The storage unit 730 stores a program for controlling an overall operation of the slave node and temporal data generated while the program is executed.

The LCP unit 750 configures values of a start slot and an end slot as 0 when an LCP connection is started, tries to establish an LCP session connection by using the configured values of the start and end slots, and then stands by for a certain time.

In the case that the LCP connection using the configured values of the start and end slots is successful, i.e., in the case that the LCP session is opened, the LCP unit 750 reports this to the slave slot management unit 740. Thereafter, the slave slot management unit 740 commands the IPCP unit 760 to perform an IPCP connection process.

If the LCP connection using the configured values of the start and end slots fails, i.e., if the LCP session fails to be opened, the LCP unit 750 examines whether the configured value of the end slot is an end slot value (e.g., 23) among slot values.

If the configured value of the end slot is the end slot value (e.g., 23) among slot values, the LCP unit 750 reconfigures the configured value of the end slot as 0 to set up a channel (set up a channel group), and tries to establish the LCP connection by using the reconfigured slot value. Then, the LCP unit 750 repeats following processes.

If the configured value of the end slot is not the end slot value (e.g., 23) among slot values, the LCP unit 750 increases the configured value of the end slot by one to set up a channel (set up a channel group), and tries to establish the LCP connection by using the increased slot value.

The IPCP unit 760 starts an IPCP connection and performs an IP allocation process under control of the slave slot management unit 740.

In the above-described configuration of the slave node, the control unit 720 may perform a function of the slave slot management unit 740. Also, the whole or part of functions of the LCP unit 750 and the IPCP unit 760 may be performed by the slave slot management unit 740.

In the case of actually realizing a product, the slave node may be configured so that the whole functions of the slave slot management unit 740 are performed by the control unit 720, or only a part of the whole functions of the slave slot management unit 740 are performed by the control unit 720.

Figure 8:
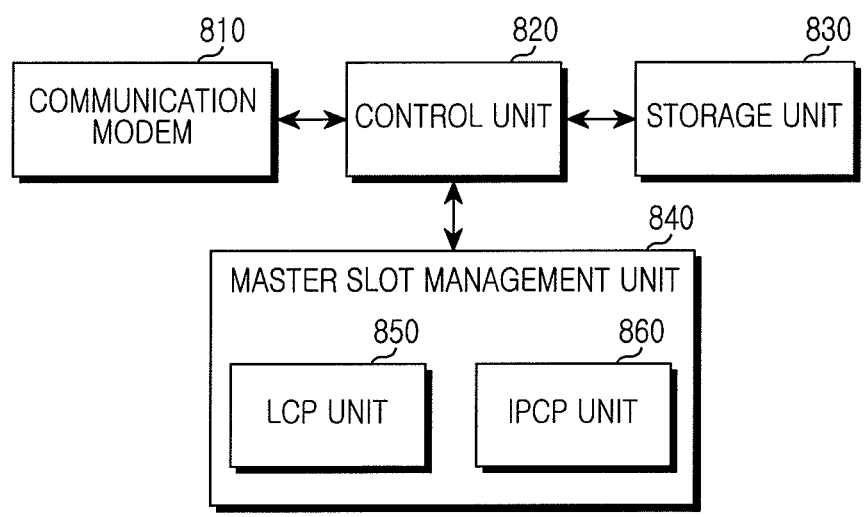
FIG. 8 is a block diagram illustrating a master node according to an embodiment of the present invention.

FIG. 8 is a block diagram illustrating the master node according to an embodiment of the present invention.

Referring to FIG. 8, the master node includes a communication modem 810, a control unit 820, a storage unit 830, and a master slot management unit 840. The master slot management unit 840 includes an LCP unit 850 and an IPCP unit 860.

The communication unit 810 includes a wire processing unit and a baseband processing unit for communicating with another node. The wire processing unit converts a signal received through a wire path to a baseband signal to provide the baseband signal to the baseband processing unit, and converts a baseband signal from the baseband processing unit to a wire signal to transmit the wire signal through an actual wire path.

The control unit 830 controls an overall process of the master node. Particularly, the control unit 820 controls the master slot management unit 840 according to the present invention.

The storage unit 830 stores a program for controlling an overall operation of the master node and temporal data generated while the program is executed.

The LCP unit 850 configures a start slot and an end slot as a predetermined value. Thereafter, in the case that the LCP session with the slave node is opened for the corresponding slot, the LCP unit 850 reports this to the master slot management unit 840. Thereafter, the master slot management unit 840 commands the IPCP unit 860 to perform an IPCP connection process.

The IPCP unit 860 starts an IPCP connection and performs an IP allocation process. That is, the IPCP unit 860 allocates an IP address to the slave node.

In the above-described configuration of the master node, the control unit 820 may perform a function of the master slot management unit 840. Also, the whole or part of functions of the LCP unit 850 and the IPCP unit 860 may be performed by the master slot management unit 840.

In the case of actually realizing a product, the master node may be configured so that the whole functions of the master slot management unit 840 are performed by the control unit 820, or only a part of the whole functions of the master slot management unit 840 are performed by the control unit 820.

According to the present invention, when the slave node is initially installed or when channel information of the master node is changed, the channel for the slave node can be automatically set up. Therefore, even though an installer or an operator does not have detailed knowledge of setting up a channel for the slave node, communication between the master node and the slave node is possible. Therefore, a communication network can be easily operated, and cost of operation can be reduced.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for setting up a channel in a slave node using a fractional E1/T1 function, the method comprising:
   examining whether a Link Control Protocol (LCP) session with a master node is opened by reconfiguring an end time slot within a variable range during a connection process using a Point to Point Protocol (PPP); and
   performing an Internet Protocol Control Protocol (IPCP) connection with the master node when the LCP session is opened,
   wherein the performing of the IPCP connection with the master node comprises being allocated an IP address from the master node.

2. The method of claim 1, wherein the examining whether the LCP session with the master node is opened comprises:
   configuring a start slot and an end slot with an initial value;

trying to open the LCP session with the master node by using the configured start and end slots; and repeating a process of trying to open the LCP session with the master node by reconfiguring the end slot until the LCP session with the master node is successfully opened when the trial for opening LCP session by using the configured start and end slots fails.

3. The method of claim 2, wherein the repeating of trying to open the LCP session comprises:

examining whether the configured end slot is an end slot among slots when the LCP session with the master node fails to be opened by using the configured start and end slots;

trying to open the LCP session with the master node by increasing the configured end slot by one when the configured end slot is not the end slot among the slots;

repeating a process of trying to open the LCP session with the master node by configuring the end slot with the initial value until the LCP session with the master node is successfully opened when the configured end slot is the end slot among the slots.

4. A method for setting up a channel in a master node using a fractional E1/T1 function, the method comprising:

examining whether a Link Control Protocol (LCP) session with a slave node is opened by reconfiguring an end time slot during a connection process by using a Point to Point Protocol (PPP); and performing an IPCP connection with the slave node when the LCP session is opened, wherein the performing of the IPCP connection with the slave node comprises allocating an IP address to the slave node.

5. The method of claim 4, wherein the examining whether the LCP session with the slave node is opened comprises examining whether an LCP session opening request is received by reconfiguring an end time slot from the slave node.

6. A device for a slave node which sets up a channel by using a fractional E1/T1 function, the device comprising:

a Link Control Protocol (LCP) unit comprising at least one processor configured to examine whether an LCP session with a master node is opened by reconfiguring an end time slot within a variable range during a connection process by using a Point to Point Protocol (PPP); and an Internet Protocol Control Protocol (IPCP) unit comprising at least one processor configured to perform an IPCP connection with the master node when the LCP session is opened, wherein the IPCP unit performs the IPCP connection with the master node by being allocated an IP address from the master node.

7. The device of claim 6, wherein the LCP unit examines whether the LCP session with the master node is opened by configuring a start slot and an and slot with an initial value, trying to open the LCP session with the master node by using the configured start and end slots, and repeating a process of trying to open the LCP session with the master node by reconfiguring the end slot until the LCP session with the master node is successfully opened when the trial for opening LCP session by using the configured start and end slots fails.

8. The device of claim 7, wherein the LCP unit repeats the process of trying to open the LCP session with the master node by examining whether the configured end slot is an end slot among slots when the LCP session with the master node fails to be opened by using the configured start and end slots, trying to open the LCP session with the master node by increasing the configured end slot by one when the configured end slot is not the end slot among the slots, and trying to open the LCP session with the master node by configuring the end slot with the initial value when the configured end slot is the end slot among the slots.

9. A device for a master node which sets up a channel by using a fractional E1/T1 function, the device comprising:

a Link Control Protocol (LCP) unit comprising at least one processor configured to examine whether an LCP session with a slave node is opened by reconfiguring an end time slot during a connection process by using a Point to Point Protocol (PPP); and an IPCP unit comprising at least one processor configured to perform an IPCP connection with the slave node when the LCP session is opened, wherein the IPCP unit performs the IPCP connection with the slave node by allocating an IP address to the slave node.

10. The device of claim 9, wherein the LCP unit examines whether the LCP session with the slave node is opened by examining whether an LCP session opening request is received by reconfiguring an end time slot from the slave node.

* * * * *